United States Patent [19]
Vollmer et al.

[11] Patent Number: 6,149,051
[45] Date of Patent: Nov. 21, 2000

[54] BRAZE TITANIUM

[75] Inventors: John Vollmer, Lomita; Matthew Pohlman, Huntington Beach, both of Calif.

[73] Assignee: AlliedSignal Inc., Morristown, N.J.

[21] Appl. No.: 09/119,673

[22] Filed: Jul. 21, 1998

Related U.S. Application Data

[60] Provisional application No. 60/055,010, Aug. 7, 1997.

[51] Int. Cl.$^7$ .............................. B23K 1/19; B23K 31/00; B23K 31/02
[52] U.S. Cl. .................................. 228/262.72; 228/248.1; 228/183
[58] Field of Search ................................ 228/183, 248.1, 228/262.72; 29/494

[56] References Cited

U.S. PATENT DOCUMENTS

| | | | |
|---|---|---|---|
| 2,834,101 | 5/1958 | Boam et al. | 29/488 |
| 3,591,917 | 7/1971 | Shira | 29/494 |
| 3,660,891 | 5/1972 | Martin | 29/494 |
| 3,740,830 | 6/1973 | Campbell, Jr. et al. | 29/472.7 |
| 4,081,121 | 3/1978 | Picard | 228/181 |
| 5,364,010 | 11/1994 | Mizuhara | 228/124.6 |
| 5,382,769 | 1/1995 | Jensen | 219/85.15 |

OTHER PUBLICATIONS

Botstein et al., "Brazing of Titanium–Based Alloys With Amorphous 25wt.% Ti–25wt.% Zr–50% Cu Filler Metal," Materials Science and Engineering, pp. 305–315 (1994).

C. Cadden, et al., "Microstructural Evolution and Management Properties and Braze Joints in Ti–13.4A1–21.2nb," Welding Research Supplement, pp. 316–325s (Aug. 1997).

E. Hoffman, et al., "Evaluation of Enhanced Diffusion Bonded Beta Titanium Honeycomb Core Sandwich Panels With Alpha–2 Titanium Aluminide Face Sheets,", NASP Technical Memorandum 1135 (1991).

Huang, et al., "Effect of Heat treatment on the Microstructure oaf a Metastable β–Titanium Alloy," Journal of Materials Engineering and Performance, v.3(4), pp. 560–566 (Aug. 1994).

S. Hughes, "High Temperature Brazed Titanium Structures," (unknown date).

H. Nagler, et al., "Arc Welding of Reactive Metals and Refractory Metals,", (unknown date).

T. Onzawa, et al., "Brazing of Titanium Using Low–Melting Point Ti–Based Filler Metals," Welding Research Supplement, pp. 462–467s (Dec. 1990).

R. Peaslee, "Brazing Q & A", (1991).

Rabinkin, "New Applications for Rapidly Solidified Brazing Foils,", Welding Journal, pp. 39–46 (Oct. 1989).

J. Sorensen, et al., "Titanium Matrix Composites, "NASP contractor report 1096 (1990).

Marcus Simon, "Brazing Titanium Beta–21S With a 40Ti–20Cu–20Ni–20Zr Brazing Filler Metal," TMS Minerals–Metals–Materials Outstanding Student Paper Contest Winner–1996 Undergraduate Winner (Dec. 1996).

*Primary Examiner*—Patrick Ryan
*Assistant Examiner*—Cecilia Newsome
*Attorney, Agent, or Firm*—William J. Zak, Jr., Esq.

[57] ABSTRACT

A method of brazing a Ti-15 Mo-3 Nb-3 Al-0.2 Si base material includes the steps of coating a braze material onto a base material. The braze material comprises substantially only a Ti—Cu—Ni—Zr mixture, with the mixture comprising about 40 wt % Ti. In particular, the braze material may comprise 40Ti-20 Cu-20 Ni-20 Zr. A following step includes heating the braze material and then forming a braze joint between the braze and base materials. The heating step can occur from about 760 to 932° C. and over 15 to 90 minutes.

14 Claims, 3 Drawing Sheets

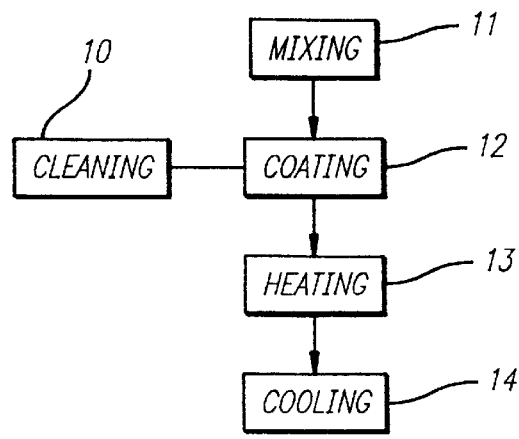
FIG. 1
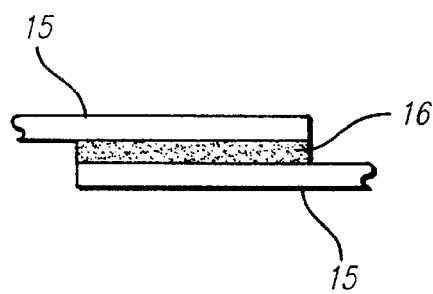
FIG. 2
FIG. 3
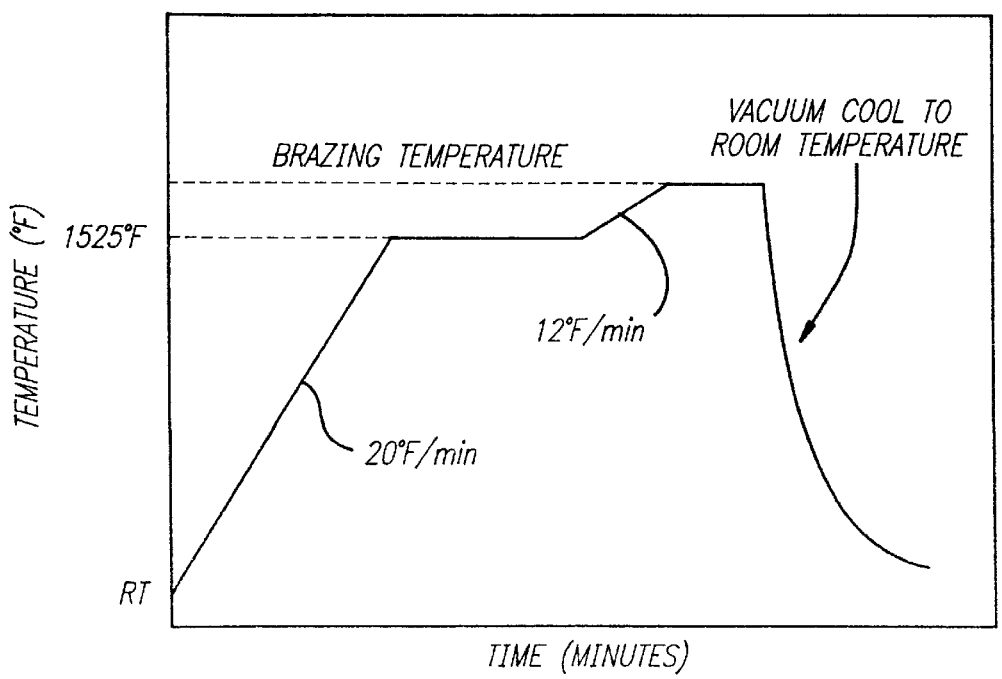

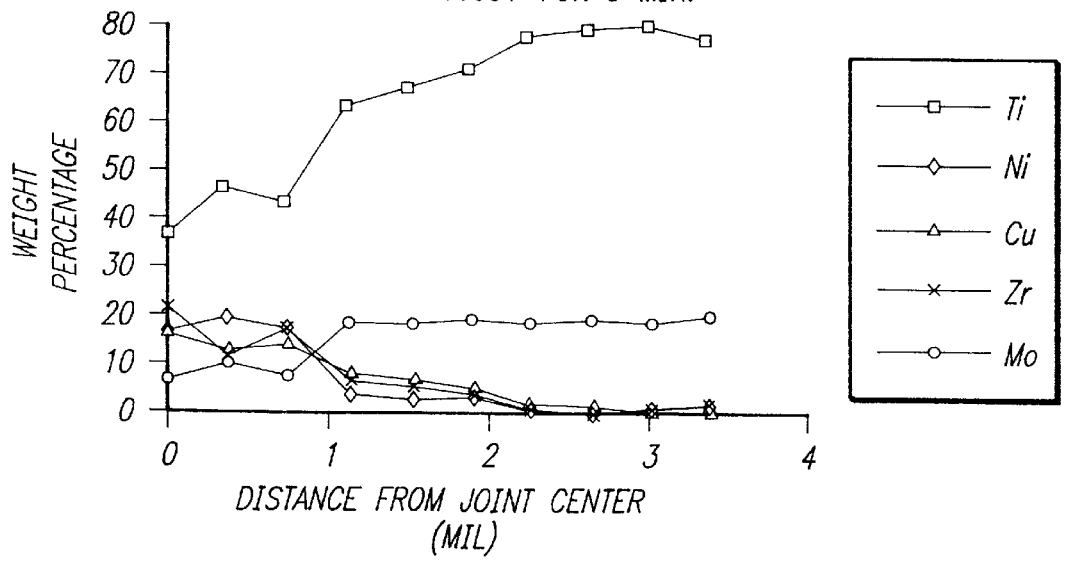
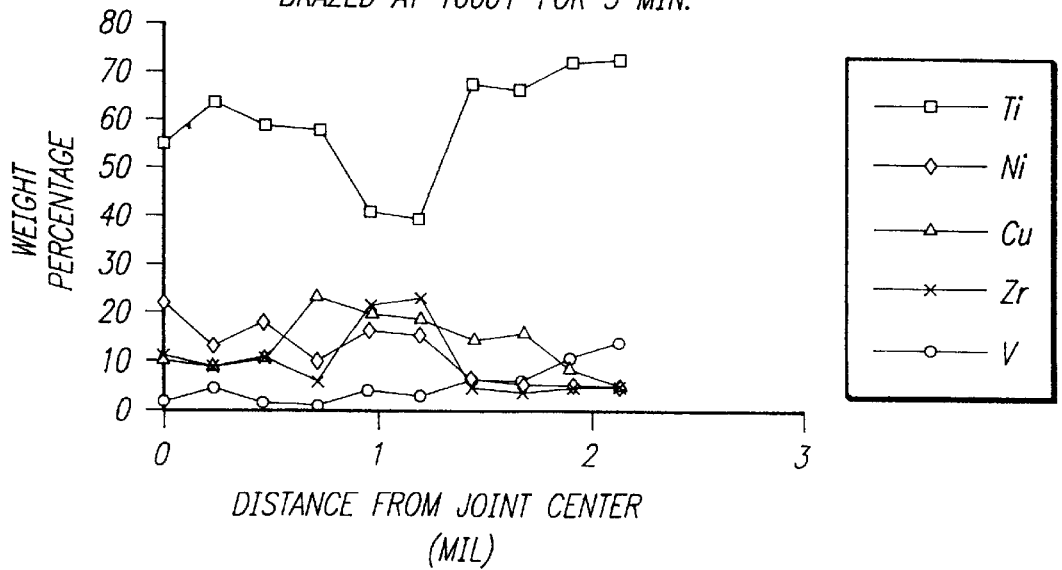

BRAZE TITANIUM

CROSS-REFERENCE TO RELATED APPLICATIONS

The present application claims the benefit of U.S. Provisional Application No. 60/055,010 filed Aug. 7, 1997.

BACKGROUND OF THE INVENTION

The present invention generally relates to joining processes for metals and, more particularly, improved methods for brazing beta titanium alloys including Ti-15 Mo-3 Nb-3 Al (Beta 21S).

Titanium alloys have been of considerable interest in many applications due to their highly desirable performance characteristics. Among other things, they provide low density, high strength, fatigue resistance, corrosion resistance, and good strength-to-weight ratio. Titanium alloys have been of benefit in many environments, including aerospace. As an example, for aircraft heat exchangers, there is a constant incentive to minimize design weight. The operating conditions of heat exchangers also involve high stresses induced by pressure and temperature, together with fatigue loading. Temperatures in some aircraft heat exchanger applications can be in excess of 1000° F. Titanium alloys have offered a distinct weight advantage over the presently used stainless steel and nickel base alloy designs.

Of the various titanium alloys that exist, metastable beta-titanium alloys are of great interest, particularly in aerospace applications requiring highly formable sheet metal or foil gages. One of the most promising Beta alloys is Beta 21S, i.e., a beta alloy containing about 21% of alloying additions. Beta 21S was developed to overcome some of the disadvantages of the other titanium alloys. As an example, alpha-beta alloys tend to have poor formability, while other beta alloys tend to have reduced elevated temperature properties. In contrast, Beta 21S has good formability, good elevated temperature properties, low density, and oxidation resistance.

Yet, the ability to employ Beta 21S in aerospace or other applications is limited by the ability to join pieces of Beta 21S together. Without the ability to adequately join, any application is limited in size and complexity. That is, the application is limited by the ability to make and form a single piece of a base material large enough to make the final product. If a mechanical joining process is needed to join multiple pieces of base material, weight savings from the base material itself may be lost. And the product design may require changes to accommodate a mechanical fastener. Additionally, the ability to attach objects to the base material can become limited by the physical presence of a mechanical fastener which might need to be located at the joiner point between the base material and the object.

On the other hand, the advantages of a non-mechanical, joining process of base materials can be significant. Some non-mechanical or metallurgical joining processes have included welding, diffusion bonding and brazing. The advantages of non-mechanical joining can be most evident particularly when the base material is of a thin gage type and, thus, weight savings are increased. A thin gage material might be of an order around 0.002 to 0.090 inches thick. Also, and unlike a mechanical fastener, a non-mechanical joint can minimize the disadvantages of joining an object where the base material is itself joined. This minimization is achieved since the bulk or space occupied by mechanical fasteners are omitted.

Still, there are disadvantages from non-mechanical joining. They can include excessive alloying, metallurgical interactions, dissolution and erosion of base materials, and degradation of mechanical properties. In spite of their disadvantages and because of the advantages provided by titanium alloys, including Beta 21S, considerable effort has been made in the past to improve their non-mechanical joining. Much of the effort has recently focused on brazing.

Brazing may be generally characterized as exposing the base material and braze material to a temperature sufficient to cause the braze material to melt. The atoms from the braze material then interdiffuse with the atoms in the base material. Upon the braze material solidifying, a joint is formed. While the general brazing process appears to be clear and straightforward in principle, research indicates to the contrary. The quality of the braze joint is highly dependent upon various factors in the brazing process, such as temperature, rate of heating and cooling, composition of the braze material and composition of the base material. While the attempts to determine the effect of these factors have been many, their interdependent relationships remain less clear.

As an example of temperature and braze material dependency, C. Cadden et al., "Microstructural Evolution and Mechanical Properties and Braze Joints in Ti-13.4 Al-21.2 Nb," Welding Research Supplement, pp.316–325s (August 1997) addressed an alpha-two Ti base material with a Ti—Cu—Ni braze material. Cadden et al. indicate that, depending upon the braze temperature, the braze joint can have a room temperature tensile strength comparable to alpha-two and an elevated temperature (649° C. and 760° C.) tensile strength of 70 to 80% of the base metal tensile strength. Even with different nickel contents in the braze material, the average nickel content in the joint was found to be nearly constant. However, as between a melt-spun braze foil and a laminated braze foil, the latter produced higher levels of nickel in the centerline of the joint, which was believed to lead to poorer room temperature tensile behavior.

In another study of how temperature can affect the braze joint, T. Onzawa et al., "Brazing of Titanium Using Low-Melting Point Ti-Based Filler Metals," Welding Research Supplement, pp. 462–467s (December 1990) investigated the base materials of commercially pure titanium (CPTi) and Ti-6 Al-4 V. The different filler metals used with the base materials included Ti-37.5Zr-15Cu-10Ni, Ti-35Zr-15Cu-15Ni and Ti-25Zr-50Cu. Onzawa et al. concluded that brazing above the alpha-beta transformation temperature and the beta transus temperature of the base metal would cause the grains in the base metal to coarsen and fine Widmanstätten structure to form at the joint area. This resulted in poor mechanical properties. Below the transition temperatures, the fine grains of the base metals were preserved, as well as the braze zone being distinct from the braze metal. This led to better mechanical properties. Onzawa et al. also determined that a shorter holding time at a braze temperature could improve the mechanical properties.

The effect of temperature and cooling rate on Beta 21S was described by Huang et al., "Effect of Heat Treatment on the Microstructure of a Metastable β-Titanium Alloy," Journal of Materials Engineering and Performance, v. 3(4), pp. 560–566 (August 1994). They found that alpha precipitated preferentially on the grain boundaries during higher temperature aging and within the grains during lower temperature aging. High temperature solutioning produced a coarse grain size, while resolutioning treatment followed by slow cooling (such as during brazing) resulted in alpha precipitation. But with air cooling, precipitation was suppressed.

Another temperature and cooling rate investigation involved Ti-Pd and Ti-6Al-4 V alloys brazed with 25Ti-25Zr-50Cu. Botstein et al. "Brazing of titanium-based alloys with amorphous 25 wt. % Ti-25 wt. % Zr-50 wt. % Cu filler metal," Materials Science and Engineering, pp. 305–315 (1994). Botstein et al. determined that high heating and high cooling rate created only traces of Widmanstatten structure at the joint interface. On the other hand, low heating and low cooling rate tended to result in a coarse dendritic structure having high microhardness and low fracture strength.

In investigating the confluence of temperature, cooling rate, braze material and base material, Rabinkin, "New Applications for Rapidly Solidified Brazing Foils," Welding Journal, pp. 39–46 (October 1989) described rapid solidification as a process having high cooling rates that allow stabilization of alloys into an amorphous state. Because such alloys provide "instant melting," Rabinkin indicated that they can be used to braze at lower temperatures and for a shorter time. As pointed out, these features are well suited to brazing items such as fine-gauge honeycomb which require protection from molten filler metals. More importantly, according to Rabinkin, is the ductility of the alloys, thus eliminating the need for large joint clearances to fill the braze cross-section. Rapidly solidified foils of 75Ti-15Cu-15Ni (sic) and 83.1Zr-16.9Ni were considered by Rabinkin to be advantageous for titanium base materials. On the other hand, Rabinkin indicated that braze powders have drawbacks that the rapidly solidified foils overcome. Apparently included in the group of disadvantageous powders is Ti-Zr-Cu-Ni which had been used on titanium based alloys, including tubing and honeycomb aircraft structures.

Additional articles providing background information on joining alloys by brazing and other methods include E. Hoffman et al., "Evaluation of Enhanced Diffusion Bonded Beta Titanium Honeycomb Core Sandwich Panels With Alpha-2 Titanium Aluminide Face Sheets," NASP Technical Memorandum 1135 (1991); S. Hughes, "High Temperature Brazed Titanium Structures," (unknown date); H. Nagler et al., "Arc Welding of Reactive Metals and Refactory Metals," (unknown date); R. Peaslee, "Brazing Q & A," (1991); and J. Sorensen et al., "Titanium Matrix Composites," NASP Contractor Report 1096 (1990).

As can be seen, there is a need for improved methods for brazing beta titaniums, including Beta 21S. There is a particular need for improved brazing methods that are less temperature and/or time dependent such that processing parameters need not be so tightly controlled. Likewise, there is a need to provide an improved brazing method which enables other objects to be welded at the brazed joint to further fabricate a complex assembly but without deteriorating the brazed joint. There is a further need to provide a brazing method which can utilize a braze material which is easy and economical to formulate.

SUMMARY OF THE INVENTION

A method of brazing a substantially isomorphous beta phase only titanium base material comprises the steps of coating a braze material onto the base material, with the braze material comprising substantially of only a Ti—Cu—Ni—Zr mixture; heating the braze material; and forming a braze joint between the braze and base material.

These and other features, aspects and advantages of the present invention will become better understood with reference to the following drawings, description and claims.

BRIEF DESCRIPTION OF THE DRAWINGS

FIG. 1 schematically depicts the steps or acts of a brazing method according to an embodiment of the present invention;

FIG. 2 is a side view of a base material brazed with a braze material according to an embodiment of the present invention;

FIG. 3 is a graph depicting temperature v. time of a brazing cycle according to an embodiment of the present invention;

FIG. 4 is a graph depicting weight percentage of braze elements v. distance from joint center for a braze cycle according to an embodiment of the present invention;

FIG. 5 is a graph depicting weight percentage of braze elements v. distance from joint center for a braze cycle according to another embodiment of the present invention;

DETAILED DESCRIPTION OF THE INVENTION

Figure 6:
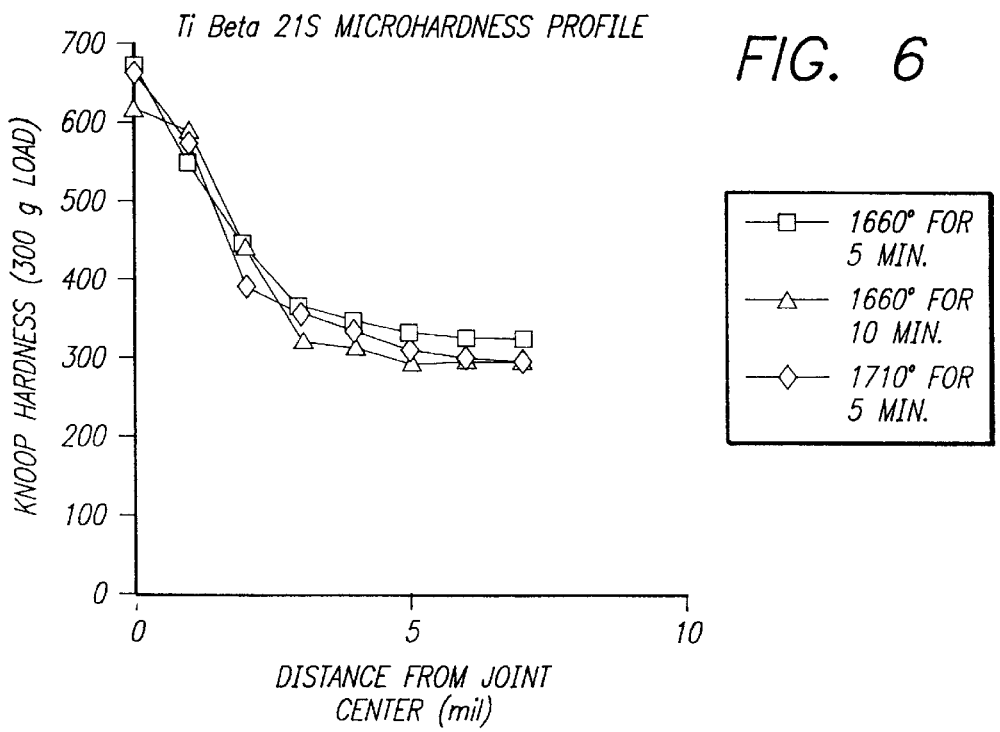
FIG. 6 is a graph depicting Knoop hardness v. distance from joint center for a braze cycle according to an embodiment of the present invention.

FIG. 1 depicts the overall steps or acts of a brazing cycle according to one embodiment of the present invention. The base materials 15 to be brazed together undergo a cleaning step or act 10. For one preferred embodiment, the base material 15 comprises Ti-15 Mo-3 Nb-3 Al 0.2 Si (Beta 21s). Either before, concurrently, or after the cleaning step 10, the components of a braze material are mixed in a mixing step or act 11 to form a braze mixture. In this one embodiment of the invention, the braze mixture comprises 40 Ti-20 Cu-20 Ni-20 Zr. In a coating step or act 12, the braze mixture is applied to at least one of the two pieces of base materials 15 to be joined together. Next, the base materials 15 are heated in a heating step or act 13 up to a brazing temperature such that a braze joint 16 is formed between the braze materials and the base materials 15. Thereafter, the braze joint 16 is subjected to a cooling step or act 14, whereby the braze joint 16 solidifies.

In more particularly describing the steps or acts of a preferred embodiment of the present invention, it should be understood that the base materials 15 to be brazed can vary both in thickness and composition. However, the present invention can be extremely useful for thin foils or gages of base material 15 on the order of about 0.002 to 0.090 inches thick. Likewise, the brazing cycle shown in FIG. 1 is particularly useful for what may be termed "substantially isomorphous beta phase only titanium alloys." Those alloys are intended to be distinguished from alloys that can be termed "substantially alpha phase only titanium alloys" and "alpha-beta titanium alloys." Further, the term "substantially isomorphous beta phase only titanium alloy" is intended to mean an alloy that primarily exists in a metastable beta phase at ambient temperatures. In contrast, the terms "substantially only alpha phase titanium alloy" and "substantially only near alpha phase titanium alloy" are intended to mean an alloy that primarily exists in an alpha phase at ambient temperatures. Similarly, the term "alpha-beta titanium alloy" is intended to mean an alloy having substantial amounts of both alpha and beta phases at ambient temperatures.

Examples of substantially isomorphous beta phase only titaniums include Ti-15 V-3 Cr-3 Sn-3 Al (Ti 15-3), Ti-15Mo-3Nb-3Al-0.2Si (Beta 21S) and Ti-13 V-11Cr-3Al. Substantially alpha (or near alpha) phase only titaniums include commercially pure titanium (CPTi), Ti-6Al-2Sn-4Zr-2Mo and Ti-5Al-2.5Sn. The alpha-beta titaniums include Ti-3Al-2.5 V, Ti-6Al-4 V and Ti-7 Al-4 Mo.

Irrespective of the particular composition of the base material 15, the base material 15 initially undergoes a cleaning step 10. The step or act 10 is intended to remove oxides present on the surface of the base material 15, as well as to degrease the base material 15. The manner of oxide removal and degreasing can occur by any known method practiced in the art. For example, the base material 15 can first undergo acid pickling in about 35% volume nitric acid and about 3 oz/gallon ammonium biflouride for about one minute to remove surface oxides. Thereafter, the base material 15 can be degreased in isopropanol. Other suitable means for accomplishing the cleaning step 10 include pickling in accordance with American Society of Testing and Materials (ASTM) specification B 600.

After the base material 15 is subjected to the cleaning step or act 10, the base material 15 can optionally be coated with a binder to assist in adhering the braze material to the base material 15 in step 12. While the particular binder may vary, it is generally characterized as a polymer adhesive having a very low residual ash content and that volitizes completely at temperatures below about 1000° F. Some examples of useful binders include Nicrobraz cements produced by Wall Colmonoy Corp. of Madison Heights, Mich. If the base material 15 is coated with a binder, the same preferably occurs just before the coating of the braze material. With such timing, the binder is still tacky and can better adhere to the base material 15 and the braze material.

Either before, during or after the cleaning step 10, the braze components of the braze material are mixed in the mixing step or act 11. As with the base material 15, the braze material can vary. But for a preferred embodiment of the present invention, the braze mixture comprises substantially only a mixture of titanium, copper, nickel, and zirconium. Accordingly, other elements that might be present in the braze mixture (such as vanadium, chromium, tin, and aluminum) would be considered impurities. Further, it is preferred that the Cu—Ni—Zr portion of the mixture comprises about 60 wt. % and the Ti comprises about 40 wt. %. Usefully, the relative amounts of the constituents are at about 25–60 wt. % Ti, 10–25 wt. % Cu, 15–25 wt. % Ni, and 15–25 wt. % Zr. Preferably, the braze mixture comprises about 40 wt. % Ti, 20 wt. % Cu, 20 wt. % Ni, and 20 wt. % Zr (Ti-20Cu-20 Ni-20 Zr).

A braze material or mixture, as known in the art, can be in various forms. The forms have included laminated foils, homogeneous or rapid solidification foils, and powders. While the present invention contemplates that the braze material can be usefully employed in the form of a foil, a powder form is preferred because of its homogeneity and ability to control particle size, as further described below. Accordingly, the mixing step 11 to form the braze mixture is described herein as forming a powdered mixture.

In forming the powdered braze material, the process can include well known means in the art. However, powders can be obtained by purchasing them commercially, such as from Praxair in Danbury, Conn., or Micron Metals in Salt Lake City, Utah. In forming the braze powders, they can be made for example by elemental blending, plasma rotating electrodes, gas atomization, reaction synthesis and mechanical comminution.

Elemental blending involves obtaining the constituents as a powder and then blending them together in the necessary percentages. Plasma rotating electrode powders are made by melting a spinning electrode using a plasma torch and the molten droplets (protected from oxidation) are then collected in a catch basin. Gas atomization involves pouring molten alloy through a compressed gas stream that breaks up the molten alloy into droplets. The droplets solidify as they fall into a catch basin. Reaction synthesis powders are made by combining fine particles (possibly elemental powders) to form larger particles of the desired composition. Mechanical comminution employs the grinding or pulverizing of a pre-alloyed ingot. The ingot is made by taking known weight amounts of the constituents and then melting them into an ingot shape. Mechanical comminution is preferred in this invention because of the economy of the process. Further explanation of several of these processes is provided in the American Society for Metals Handbooks by the American Society for Metal, Ninth edition (1984).

Although the particle size of the braze powder can vary, it is preferred that the particle size be around 170 to 325 mesh for this embodiment of the invention. Above such size range, the homogeneity of the braze constituents reaches a less than preferred level such that the mechanical properties of the final braze joint is less than preferred. Additionally, and as a result of a less than preferred homogeneity, the required amount of braze material must be increased to achieve the same braze joint characteristics as when the preferred homogeneity is present. Below the desired mesh size range for the particles, there can be difficulty in handling, such as caking and explosions. Another difficulty can be in the ease with which the braze is coated to the base material 15.

Upon completion of the mixing step 11, the coating step or act 12 occurs. Therein, the braze mixture is coated on one or both of the two base materials 15 to be brazed together. The amount of braze mixture needed to accomplish the brazing will vary according the size of the joint gap between the base materials. In general, the amount of the braze mixture is that which is necessary to ensure good fusion of the faying surfaces of the base materials 15. In the context of heat exchangers, typical joint gaps may range from about 0.001 to 0.003 inches. For these sizes of joint gaps and others which might range from about 0.001 to 0.01 inches, the amount of the braze mixture preferably used will be about 0.1 to 0.5 grams/in$^2$. By so doing, adequate filling of the joints is achieved. Upon one or both of the base materials 15 being coated with the braze mixture, the base materials 15 can be juxtaposed to one another and placed in a mating relationship, such as that shown in FIG. 2 for purposes of example.

Next, the mated base materials 15 with the braze mixture therebetween undergo the heating step or act 13. The heating occurs at a rate and up to a temperature to nearly melt the braze mixture. The heating step 13 is carried out with the intent to provide a braze joint 16 which is characterized by, among other things, uniformity of braze constituent concentrations across the width of the joint. It is also characterized by a substantially void free phase(s) and fillet formation with a low contact angle, all of which is determined upon optical and scanning electron microscopy. As a consequence of the joint characteristics, the base material 15 is characterized at the base-joint interface by minimal grain erosion.

To achieve the desired joint characteristics or morphology mentioned above, the heating step 13 preferably includes a step or act of securing the mated base materials 15 together to prevent movement. Otherwise, the formation of the braze joint 16 can be disturbed with a resulting deterioration of the above desired morphological characteristics. Various means can be employed to secure the base materials 15, such as by simply tying them with a nichrome wire or dead weight loading. After the base materials 15 are secured, they are preferably heated in a stepped fashion. The purpose of the stepped heating, as compared to a single heating, is to allow the assembly to achieve thermal stability prior to proceeding to the brazing temperature and to allow removal of binder and other contaminants.

As illustrated in FIG. 3, a first or initial heating step starts at room temperature RT and then increases at a first or initial heating rate of about 2 to 20° F./min (1.1 to 11° C./min). The initial heating occurs until a holding temperature of about 1400 to 1530° F. (about 760 to 832° C.) is reached. Preferably, the initial heating rate is about 20° F./min (about 11° C./min) and the holding temperature is about 1525° F. (about 829° C.) for this embodiment of the invention. The initial heating step or act is generally intended to uniformly heat the assembly of braze mixture and base materials 15 up to the binder burn off temperature. The particular initial heating rate up to the holding temperature serves to ensure uniform thermal expansion of the assembly. The particular holding temperature serves to allow binder vaporization and ensure the assembly is at a uniform temperature before proceeding to the braze temperature. In this embodiment, the holding temperature is held substantially constant for a holding period of about 15 to 60 minutes. However, a preferred holding period is about 30 minutes.

Following the holding period, the base and braze materials are subjected to a second or subsequent heating step at a second or subsequent heating rate. The subsequent heating occurs up to a brazing temperature of the braze material. In essence, the brazing temperature for any particular braze material is above its solidus and its liquidus temperatures. For example, the brazing temperature for Ti-20 Cu-20 Ni-20 Zr is about 1650° F. (900° C.), while its solidus and liquidus temperatures are about 1558° F. (848° C.) and 1573° F. (856° C.), respectively. The subsequent heating rate is from about 2 to 14° F./min (1.1 to 7.7° C./min), and more preferably at about 12° F./min (about 6.6° C./min). The particular subsequent heating rate is intended to quickly yet uniformly heat the assembly. At the brazing temperature, the temperature is held for a brazing dwell time of about 0 to 30 minutes and, more preferably about 10 minutes. The length of the brazing dwell time is sufficient to allow wetting and fusion but avoiding erosion of the base material 15 or excess diffusion of the braze mixture into the base material 15.

After the step 13 of heating, the base and braze materials are subjected to the step or act 14 of cooling from the brazing temperature and down to room temperature. The cooling step 14 allows the braze joint 16 to soldify. Various means of cooling the braze and base materials can be utilized, such as by vacuum and inert gas cooling. The rate of cooling can be any rate that does not lead to excess distortion of the assembled base materials 15. The term "excess distortion" is intended to mean loss of dimensions of the base material 15 details beyond a tolerable level for the desired application.

EXAMPLES

Beta 21S, Ti 15-3 and grade 4 CPTi were subjected to brazing to themselves so there was no cross over of base materials. The Beta 21S was obtained from Texas Instruments of Boston, Massachusetts, as were the Ti 15-3 and the CPTi . Each had a thickness of about 0.01 inches. A braze powder comprising 40Ti-20 Cu-20 Ni-20 Zr was obtained from Micron Metals. All three base materials were first acid pickled in 35% volume nitric acid and 3 oz/gallon ammonium biflouride for one minute. The base materials were then degreased in isopropanol. NB (Nicrobraz) 500 binder in a thin film was then applied to the base materials. The braze mixture was applied to both base materials to be joined in a single lap joint. Three lap samples were made for each of the base materials. The joint gaps were about 3–4 mils for Beta 21S, about 3–4 mils for Ti 15-3, and about 7.5–9 mils for CPTi. The base materials were then secured together with nichrome wire.

The three lap samples for each of the base materials were subjected to three different temperature-time cycles in a vacuum furnace. The initial heating rate for all three samples was 20° F./min (11° C./min), as was the holding temperature of 1525° F. (829° C.). At the holding temperature, all samples were soaked for 30 minutes. Next, the subsequent heating rate was set at 12° F./min (6.6° C./min ) until a respective brazing temperature was reached. Three different brazing temperatures and brazing dwell times were used for each of the different base materials. They were 1660° F. (905° C.) for 5 minutes, 1660° F. (905° C.) for 10 minutes and 1710° F. (932° C.) for 5 minutes.

After holding at the brazing temperatures, the samples were vacuum cooled to room temperature under a vacuum of $1 \times 10^{-4}$ or better. The samples were then sectioned, mounted, mechanically polished, and etched in Kroll's and/or Keller's reagent. An optical and scanning electron microscope was used for examining the samples. Microhardness traverses were performed on the samples using a Knoop indenter with a 300 gram load.

Beta 21S and Ti 15-3 Samples

All samples exhibited void free uniform braze joints. Each sample showed fillet fomation with a low concave contact angle which is indicative of good wetting. The base materials exhibited rapid grain growth because of the time at high temperature. The volume fraction of precipitates appeared to have increased with increasing brazing dwell time or brazing temperature. The grains of the base materials eroded slightly near the braze interaction region due to some of the titanium dissolving into solution. The erosion was relatively constant for the three different braze cycles, perhaps because the formation of an intermetallic layer between the base material and the braze alloy prevented further dissolution of the base material into the braze alloy. The intermetallic layer was thicker for the Ti 51-3 samples.

Alternatively, it may have been the molybdenum or vanadium that prevented erosion. It is believed that the molybdenum and vanadium in the Ti—Ni—Mo ternary system for Beta 21S and in the Ti—Ni—V ternary system for the Ti 15-3 raise the melting temperature. The melting temperature may be raised enough to prevent melting of the base material at the brazing temperature. This raising occurs even in the presence of the copper and nickel eutectic forming in the diffusion or interaction region. Nevertheless, the lack of base material melting may limit erosion.

The phase morphology in the center of the joint for all samples did not change with different brazing temperature-brazing dwell times. The joint appeared to be composed of a matrix phase with a blocky secondary phase dispersed throughout. There was also an interfacial phase between the base material and braze alloy. All of the phases are thought to be composed of intermetallic compounds. Etching in Kroll's reagent accentuated the interfacial phase while Keller's reagent highlighted the contrast between the matrix and blocky secondary phases. Large islands were present in the joints and which were identified by energy dispersive spectroscopy (EDS) as pieces of base material that eroded into the joint region.

EDS analysis was performed on the samples brazed at 1660° F. for 5 minutes to determine the chemical compositions across the braze joints. FIG. 4 shows the results of the EDS analysis on Beta 21S by graphically depicting weight percentage of braze constituents versus distance from joint center. According to FIG. 4, the composition of the joint center was approximately the same as the original braze alloy. The matrix phase appeared to exist over a wide range of compositions. The blocky secondary phase in the matrix phase was found by EDS to have the approximate composition of 50Ti-20 Cu-20 Ni-10 Zr. The interfacial phase contained approximately 5 wt. % each of copper, nickel and zirconium.

Figure 7:
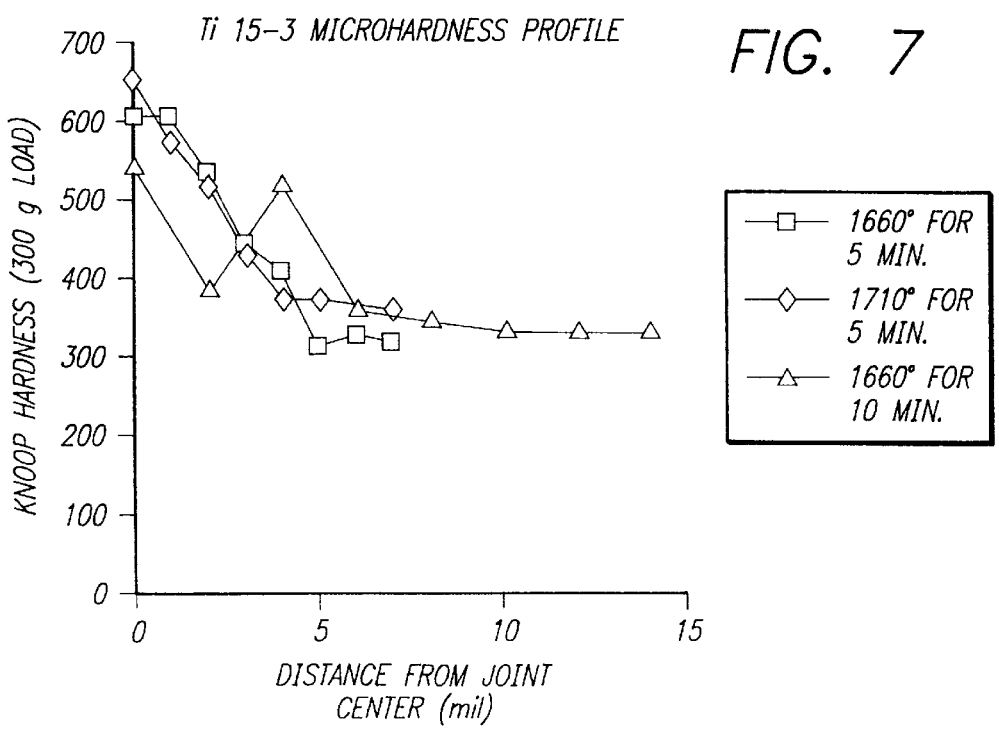
FIG. 7 is a graph depicting Knoop hardness v. distance from joint center for a braze cycle according to another embodiment of the present invention.

FIG. 5 shows the same analysis as FIG. 4, but on Ti 15-3. According to FIG. 5, the composition of the joint center was approximately the same as the original braze alloy but perhaps not as close as for Beta 21S. As with Beta 21S, the matrix phase for Ti 15-3 existed over a wide range of compositions. Also similar to Beta 21S was the fact that the blocky secondary phase for the Ti 15-3 was found to have the approximate composition of 40Ti-20 Cu-20 Ni-20 Zr. The interfacial phase also contained approximately 5 wt. % each of copper, nickel and zirconium FIG. 6 graphically depicts a microhardness profile for Beta 21S by comparing Knoop hardness versus distance from joint center. For the three different braze cycles, there was little hardness variation. Similarly, FIG. 7 depicts a microhardness profile for Ti 15-3 and indicates little hardness variation over the three different braze cycles.

In a bead-on-plate weld over braze area test, Ti 15-3 was used in a 0.050 inch sheet thickness. The Ti 15-3 was pickled and cleaned as above. About 0.25 grams/sq. inch of the above braze alloy was applied on one sample. About 0.125 grams/sq. inch of the braze alloy was applied on another sample. A third sample was left uncoated with the braze alloy. Single pass bead-on-plate welds over the braze areas were performed on the three samples with a Ti 15-3 weld alloy in an argon atmosphere. Flourescent penetrant examination was conducted to check for cracking. Transverse and longitudinal sections at the toe of the weld were taken and examined metallographically, as above, for microcracking. All samples provided suitable welds but a single hot crack was found in a longitudinally cross-sectioned sample.

Grade 4 CPTi Samples

All samples exhibited void free uniform braze joints. Each sample showed fillet fomation with a low concave contact angle. The samples brazed at 1660° F. for 5 and 10 minutes did not exhibit the grain growth present in the Beta 21S and Ti 15-3 samples. However, when the CPTi was brazed at 1710° F. for 5 minutes, there was a serrated or plate-like alpha grain structure. Near the brazed region, the equiaxed alpha grains did not transform to the serrated structure, possibly because the braze alloy pinned and restricted such transformation.

For all three CPTi samples, the braze interaction region showed a very aggressive reaction between the base material and braze alloy, as compared to Beta 21S and Ti 15-3. The grains of the CPTi material eroded significantly and increased with either higher brazing temperature or longer brazing dwell time. Alpha titanium shaped needles were visible at high magnifications (i.e., 200x) and found to be randomly distributed in the joint. The formation of these alpha needles increased with the samples brazed at 1660° F. for 10 minutes and at 1710° F. for 5 minutes. In the latter cycle, the alpha needles made up the majority of the phase in the joint center.

EDS microchemical analysis on the CPTi sample brazed at 1660° F. for 5 minutes showed significantly lower Cu—Ni—Zr concentrations and a higher Ti concentration in the joint center when compared to Beta 21S and Ti 15-3. The CPTi microstructure showed extensive erosion of the base material, apparently because of the greater reactivity of CPTi when compared to Beta 21S and Ti 15-3. It may also be due to titanium forming a ternary eutectic with copper and nickel. The eutectic is at 1650° F. with a composition of about 10 wt. % Cu, 25 wt. % Ni, and the remainder titanium. Zirconium probably behaves like titanium and probably does not affect the ternary system of Ti—Cu—Ni. The brazing dwell time and brazing temperature are apparently sufficient to cause partial melting and dissolution of the some of the base material into the braze alloy, thereby raising the composition of the titanium in the joint. On the other hand, the Mo and V in the Beta 21S and Ti 15-3 may have prevented this eutectic reaction from occurring at the brazing temperature. Accordingly, the hardness of the CPTi joint was significantly lower than the Beta 21S and Ti 15-3 joints.

As can be appreciated, the present invention provides an improved brazing method, particularly for substantially beta phase only titanium alloys. Also provided is a brazing method which is less temperature and/or time dependent than prior methods, whereby those processing parameters need not be so tightly controlled. The present invention also enables other objects to be welded at the braze joint without deteriorating the brazed joint. The process of the present invention can be used for a variety of environments and applications, including heat exchangers and honeycomb structures.

It should be understood, of course, that the foregoing relates to preferred embodiments of the invention and that modifications may be made without departing from the spirit and scope of the invention as set forth in the following claims.

We claim:

1. A method of brazing a substantially isomorphous beta phase only titanium base material selected from the group consisting of Ti-15 V-3 Cr-3 Sn-3 Al and Ti-13 V-11 Cr-3 Al, comprising the steps of:

coating a braze material onto said base material, said braze material comprising substantially of only a Ti—Cu—Ni—Zr mixture comprising about 25–60 Ti wt. %, about 10–25 Cu wt. %, about 15–25 Ni wt. %, and about 15–25 Zr wt. %;

initially heating said braze material and base material to achieve thermal stability between said braze material and base material, said initial heating being up to a temperature that is not more than a brazing temperature of said braze material;

subsequently heating said braze material and base material up to said brazing temperature;

forming a braze joint between said braze and base material.

2. The method of claim 1, further comprising the step of cooling said braze joint.

3. The method of claim 1, further comprising the step of solidifying said braze joint.

4. A method of brazing a Ti-15 Mo-3 Nb-3 Al-0.2 Si base material, comprising the steps of:

coating a braze material onto said base material, said braze material comprising a Ti—Cu—Ni—Zr mixture of particles having sizes between about 170 to 325 mesh, said mixture comprising about 25–60 wt. % Ti, 10–25 Cu wt. %, about 15–25 Ni wt.%, and about 15–25 Zr wt. %.;

initially heating said braze material and base material to achieve thermal stability between said braze material and base material, said initial heating being at a rate that does not exceed about 11° C./min and being up to a temperature that is not more than a brazing temperature of said braze material;

subsequently heating said braze material and base material up to said brazing temperature; and forming a braze joint between said braze material and base material.

5. The method of claim 4, wherein said base material is in a foil form.

6. The method of claim 4, wherein said braze material is in a powder form.

7. The method of claim 4, wherein said Ti—Cu—Ni—Zr mixture comprises about 40 wt. % Ti.

8. The method of claim 4, wherein said Ti—Cu—Ni—Zr mixture comprises about 60 wt. % of Cu—Ni—Zr.

9. The method of claim 4, wherein said Ti—Cu—Ni—Zr mixture comprises about 20 Cu wt. %, about 20 Ni wt. %, and about 20 Zr wt. %.

10. The method of claim 4, wherein the step of initially and subsequently heating occurs from about 760 to 932° C.

11. The method of claim 4, wherein the step of initially and subsequently heating occurs from about 15 to 90 minutes in total.

12. The method of claim 4, further comprising the step of cooling said braze joint under vacuum and to room temperature.

13. The method of claim 4, wherein the step of initially heating occurs at a heating rate between about 1.1 to 11°C./min.

14. The method of claim 4, wherein the step of subsequently heating occurs at a heating rate between about 1.1 to 7.7°C./min.

* * * * *